(12) United States Patent
Morikoshi

(10) Patent No.: US 10,609,876 B2
(45) Date of Patent: Apr. 7, 2020

(54) EMITTER AND DRIP IRRIGATION TUBE

(71) Applicant: Enplas Corporation, Saitama (JP)

(72) Inventor: Daisuke Morikoshi, Saitama (JP)

(73) Assignee: Enplas Corporation, Saitama (JP)

( * ) Notice: Subject to any disclaimer, the term of this patent is extended or adjusted under 35 U.S.C. 154(b) by 55 days.

(21) Appl. No.: 15/764,959

(22) PCT Filed: Sep. 16, 2016

(86) PCT No.: PCT/JP2016/077363
§ 371 (c)(1),
(2) Date: Mar. 30, 2018

(87) PCT Pub. No.: WO2017/057034
PCT Pub. Date: Apr. 6, 2017

(65) Prior Publication Data
US 2018/0279565 A1     Oct. 4, 2018

(30) Foreign Application Priority Data

Oct. 1, 2015  (JP) .................................. 2015-195669

(51) Int. Cl.
*A01G 25/02*     (2006.01)
(52) U.S. Cl.
CPC ............ *A01G 25/02* (2013.01); *A01G 25/023* (2013.01); *Y02A 40/237* (2018.01)
(58) Field of Classification Search
CPC ..... A01G 25/02; A01G 25/023; Y02A 40/237
(Continued)

(56) References Cited

U.S. PATENT DOCUMENTS 4,366,926 A * 1/1983 Mehoudar ............ A01G 25/023
239/542
4,502,631 A * 3/1985 Christen .............. A01G 25/023
239/106
(Continued)

FOREIGN PATENT DOCUMENTS

JP     2010-046094 A     3/2010
WO    2015/080116 A1    6/2015
(Continued)

OTHER PUBLICATIONS

International Search Report from International Application No. PCT/JP2016/077363 dated Dec. 20, 2016.
(Continued)

*Primary Examiner* — Chee-Chong Lee
(74) *Attorney, Agent, or Firm* — Brundidge & Stanger, P.C.

(57) ABSTRACT

This emitter has an emitter body having at least a concavity and a through-hole, and also has a flexible film that is joined to one or more surfaces of the emitter body, and blocks at least part of the opening of the through-hole and the concavity. The emitter also has a flow reduction part for reducing the flow of an irrigation liquid according to the pressure of the irrigation liquid inside the tube. The flow reduction part includes the concavity, a diaphragm which constitutes part of the film, and a valve seat to which it is possible to tightly adhere the diaphragm. The diaphragm includes a ring-shaped thin section positioned so as to surround the diaphragm region to be tightly adhered to the valve seat. The thin section is formed so as to both recess from the tube interior and also project toward the concavity.

4 Claims, 4 Drawing Sheets

(58) Field of Classification Search
USPC .......................................................... 239/542
See application file for complete search history.

(56) References Cited

U.S. PATENT DOCUMENTS

| | | | |
|---|---|---|---|
| 4,687,143 A * | 8/1987 | Gorney | A01G 25/023 |
| | | | 239/542 |
| 6,027,048 A | 2/2000 | Mehoudar | |
| 2010/0155508 A1 | 6/2010 | Keren | |
| 2012/0305676 A1 | 12/2012 | Keren | |
| 2016/0286741 A1 | 10/2016 | Kidachi | |
| 2016/0286742 A1 | 10/2016 | Kidachi | |
| 2017/0035005 A1 | 2/2017 | Kidachi | |

FOREIGN PATENT DOCUMENTS

| | | |
|---|---|---|
| WO | 2015/080119 A1 | 6/2015 |
| WO | 2015/098412 A1 | 7/2015 |

OTHER PUBLICATIONS

Extended European Search Report for EP16851208.5 dated Apr. 18, 2019.

* cited by examiner

EMITTER AND DRIP IRRIGATION TUBE

TECHNICAL FIELD

The present invention relates to an emitter and a drip irrigation tube including the emitter.

BACKGROUND ART

Conventionally, a drip irrigation method is known as a method for culturing plants. In the drip irrigation method, a drip irrigation tube is disposed on the soil where plants are planted, and irrigation liquid such as water and liquid fertilizer is dropped from the drip irrigation tube to the soil. The drip irrigation method has been increasingly attracting attention in recent years since the method can minimize the consumption rate of the irrigation liquid.

Normally, the drip irrigation tube includes a tube provided with a plurality of through holes for discharging irrigation liquid, and a plurality of emitters (also called "drippers") for discharging irrigation liquid from respective through holes. In addition, emitters which are joined on the inner wall surface of the tube (see, for example, PTL 1), and emitters which are inserted to the tube from the exterior of the tube are known.

PTL 1 discloses an emitter configured to be joined on the inner wall surface of a tube. The emitter disclosed in PTL 1 includes a first member including a water intake port for intake of irrigation liquid, a second member including an outlet for discharging the irrigation liquid, and a film member disposed between the first member and the second member. On the inside of the first member, a valve seat part disposed to surround the water intake port and a pressure reducing groove that serves as a part of a pressure reduction channel are formed. In the film member, a through hole is formed at a position corresponding to the downstream end of the pressure reducing groove.

When the first member, the film member and the second member are stacked, the pressure reduction channel is formed, and the film member makes contact with the valve seat part to close the water intake port. In addition, a channel for carrying the irrigation liquid from the water intake port to the outlet is formed.

In the emitter disclosed in PTL 1, when the pressure of the irrigation liquid in the tube is equal to or greater than a predetermined pressure, the film member closing the water intake port is pushed by the irrigation liquid, and the irrigation liquid flows into the emitter. The pressure of the irrigation liquid having entered the emitter is reduced by the reduction channel, and the irrigation liquid is quantitatively discharged from the outlet.

CITATION LIST

Patent Literature

PTL 1
Japanese Patent Application Laid-Open No. 2010-046094

SUMMARY OF INVENTION

Technical Problem

In the drip irrigation tube using the emitter disclosed in PTL 1, however, the irrigation liquid flows into the emitter only when the pressure of the irrigation liquid in the tube is equal to or greater than the predetermined pressure. Consequently, a drip irrigation tube using the emitter disclosed in PTL 1 does not work when the pressure of the irrigation liquid in the tube is significantly low. However, when the thickness of the film member (film) is reduced for the purpose of reducing the pressure required for inflow of the irrigation liquid into the emitter, the durability of the film is reduced.

In view of this, an object of the present invention is to provide an emitter and a drip irrigation tube in which a film easily deforms without reducing the durability of the film, and the irrigation liquid can be quantitatively discharged even when the pressure of the irrigation liquid is low.

Solution to Problem

To solve the above-mentioned problems, an emitter according to an embodiment of the present invention includes an emitter main body including at least a recessed portion and a through hole, and a film having flexibility that is joined to at least one surface of the emitter main body so as to seal an opening of at least a part of the recessed portion and the through hole, the emitter being configured to be joined on an inner wall surface of a tube for carrying irrigation liquid at a position corresponding to a discharging port that communicates between inside and outside of the tube, the emitter being configured to quantitatively discharge the irrigation liquid in the tube from the discharging port to the outside of the tube, the emitter including: an intake part for intake of the irrigation liquid; a discharging part configured to be disposed to face the discharging port, and configured to discharge the irrigation liquid; a channel configured to connect the intake part and the discharging part, and configured to distribute the irrigation liquid; a flow rate reducing part disposed in the channel, and configured to reduce a flow rate of the irrigation liquid in accordance with a pressure of the irrigation liquid in the tube; and a pressure reducing channel disposed on an upstream side of the flow rate reducing part in the channel, and configured to guide the irrigation liquid taken from the intake part to the flow rate reducing part while reducing a pressure of the irrigation liquid taken from the intake part, wherein the flow rate reducing part includes: a recess for reducing the flow rate, a diaphragm part having flexibility that is a part of the film, and is disposed to close a communication between inside of the recess and inside of the tube, a first through hole that opens at an inner surface of the recess, and is communicated with one of the discharging part and the pressure reducing channel, a second through hole that opens at the inner surface of the recess, and is communicated with the other of the discharging part and the pressure reducing channel, a valve seat part disposed to surround the first through hole or the second through hole and to face the diaphragm part without making contact with the diaphragm part, wherein when a pressure of the irrigation liquid flowing through the tube is greater than a predetermined value, the diaphragm part is allowed to make intimate contact with the valve seat part, and a communication groove formed on a surface of the valve seat where the valve seat part is allowed to make intimate contact with the diaphragm part, the communication groove being configured to communicate between the inside of the recess and the first through hole or the second through hole, wherein the diaphragm part includes a thin part that is disposed in a shape surrounding a region of the diaphragm part where the diaphragm part is allowed to make intimate contact with the valve seat part, and wherein the thin part is formed such that the thin part is recessed with respect to the inside of the tube, and is protruded with respect to the recess.

In addition, to solve the above-mentioned problems, a drip irrigation tube according to an embodiment of the present invention includes: a tube including a discharging port for discharging irrigation liquid; and the emitter according to any one of claims 1 to 3 that is joined on the inner wall surface of the tube at a position corresponding to the discharging port.

Advantageous Effects of Invention

With the emitter and the drip irrigation tube according to the embodiment of the present invention, the film can be easily deformed without reducing the durability of the film. In addition, the drip irrigation tube according to the embodiment of the present invention can quantitatively discharge the irrigation liquid even when the pressure of the irrigation liquid is low.

DESCRIPTION OF EMBODIMENTS

An embodiment of the present invention is described below in detail with reference to the accompanying drawings.
(Configurations of Drip Irrigation Tube and Emitter)

Figure 1:
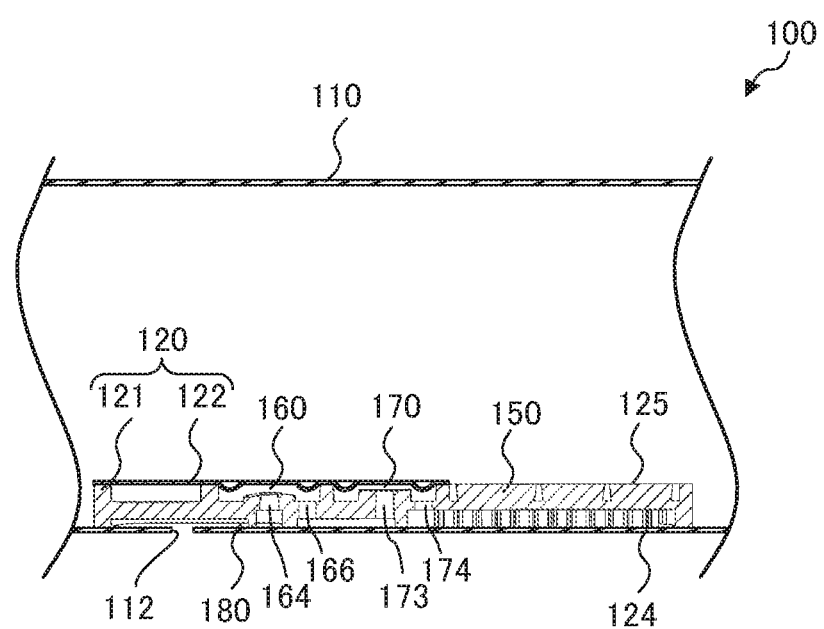
FIG. 1 is a sectional view of a drip irrigation tube according to an embodiment of the present invention.

FIG. 1 is a sectional view along the axial direction of drip irrigation tube 100 according to the present embodiment.

As illustrated in FIG. 1, drip irrigation tube 100 includes tube 110 and emitter 120.

Tube 110 is a pipe for carrying irrigation liquid. The material of tube 110 is not limited. In the present embodiment, the material of tube 110 is polyethylene. In the wall of tube 110, a plurality of discharging ports 112 for discharging irrigation liquid are formed at a predetermined interval (for example, 200 to 500 mm) in the axial direction of tube 110. The diameter of the opening of discharging port 112 is not limited as long as irrigation liquid can be discharged. In the present embodiment, the diameter of the opening of discharging port 112 is 1.5 mm Emitters 120 are joined at respective positions corresponding to discharging ports 112 on the inner wall surface of tube 110. The cross-sectional shape and the cross-sectional area of tube 110 in the direction perpendicular to the axial direction of tube 110 are not limited as long as emitter 120 can be disposed inside tube 110.

Drip irrigation tube 100 is assembled by joining rear surface 124 of emitter 120 to the inner wall surface of tube 110. The method of joining tube 110 and emitter 120 is not limited. Examples of the method of joining tube 110 and emitter 120 include welding of the resin material of tube 110 or emitter 120, bonding with an adhesive agent and the like. Normally, discharging port 112 is formed after tube 110 and emitter 120 are joined; however, discharging port 112 may be formed before tube 110 and emitter 120 are joined.

Figure 2A:
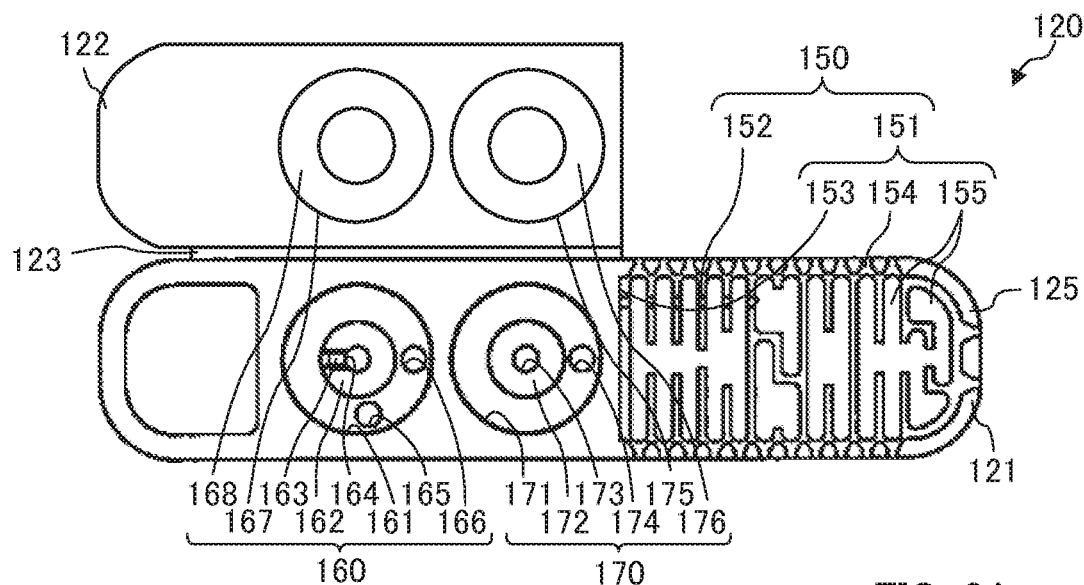
FIGS. 2A to 2C illustrate a configuration of an emitter according to the embodiment of the present invention.
Figure 2B:
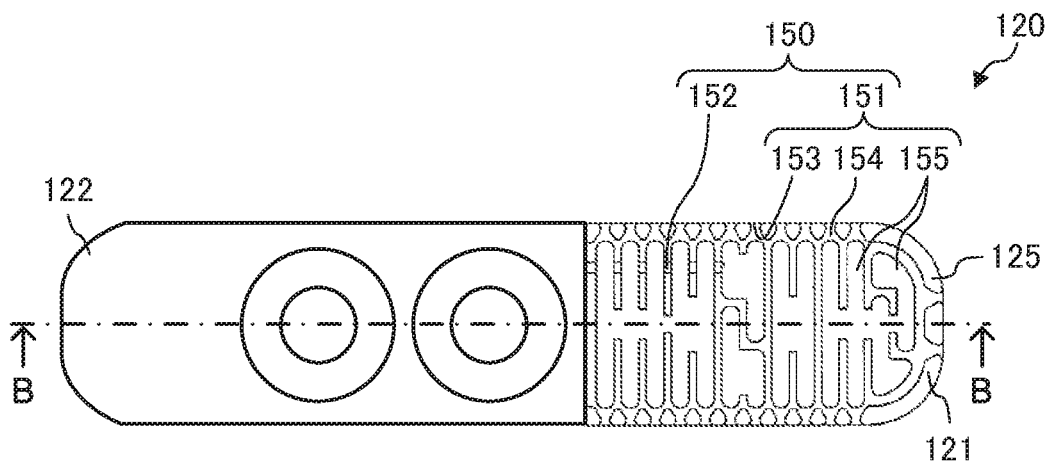
Figure 2C:
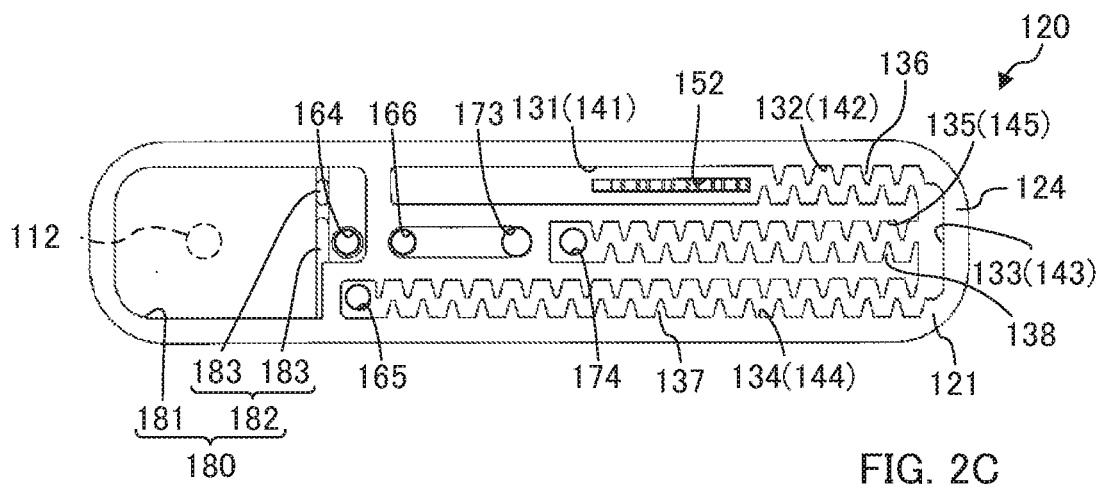
Figure 3A:
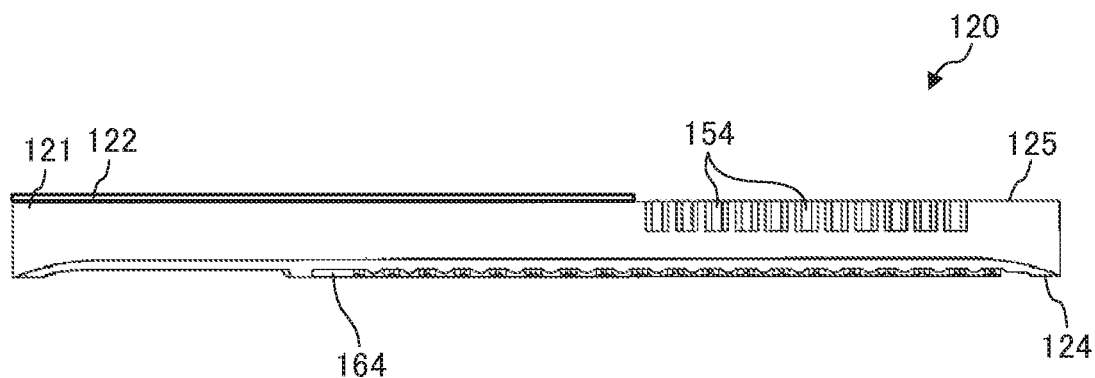
FIGS. 3A and 3B illustrate a configuration of the emitter according to the embodiment of the present invention.
Figure 3B:
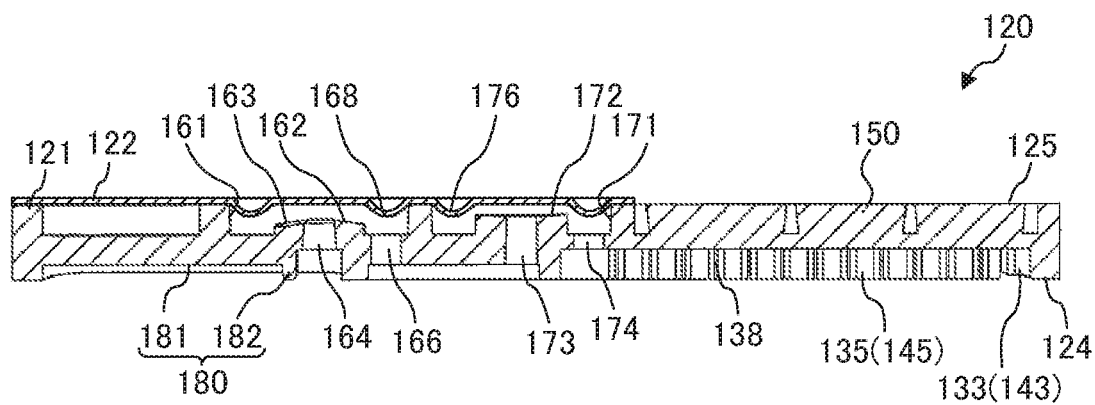

FIG. 2A is a plan view of emitter 120 before emitter main body 121 and film 122 are joined, FIG. 2B is a plan view of emitter 120 after emitter main body 121 and film 122 are joined, and FIG. 2C is a bottom view of emitter 120 after emitter main body 121 and film 122 are joined. FIG. 3A is a side view of emitter 120, and FIG. 3B is a sectional view taken along line B-B of FIG. 2B.

As illustrated in FIG. 1, emitter 120 is joined on the inner wall surface of tube 110 to cover discharging port 112. The shape of emitter 120 is not limited as long as emitter 120 can make intimate contact with the inner wall surface of tube 110 and can cover discharging port 112. In the present embodiment, in the cross-section of emitter 120 in the direction perpendicular to the axial direction of tube 110, the shape of rear surface 124 that is joined to the inner wall surface of tube 110 is a substantially arc shape that protrudes toward the inner wall surface of tube 110 along the inner wall surface of tube 110. In plan view, emitter 120 has a substantially rectangular shape with chamfered four corners. The size of emitter 120 is not limited. In the present embodiment, emitter 120 has a long side length of 25 mm, a short side length of 8 mm, and a height of 2.5 mm.

As illustrated in FIGS. 1 to 2C, emitter 120 includes emitter main body 121 that is joined to the inner wall surface of tube 110, and film 122 that is joined to emitter main body 121. Emitter main body 121 and film 122 may be integrally formed, or may be formed as separate members. In the present embodiment, emitter main body 121 and film 122 are integrally formed with hinge part 123 therebetween.

Preferably, emitter main body 121 and film 122 are formed with one material having flexibility. However, in the case where emitter main body 121 and film 122 are formed as separate members, emitter main body 121 may be formed with a material that does not have flexibility. Also, preferably, the diaphragm part (first diaphragm part 167 and second diaphragm part 175) described later is integrally formed as a part of emitter 120. In the present embodiment, emitter main body 121 and film 122 including the diaphragm part are integrally formed with one material having flexibility. Examples of the material of emitter main body 121 and film 122 include resin and rubber. When emitter main body 121 does not have flexibility, a material that does not have flexibility may be selected. Examples of the resin include polyethylene and silicone. The flexibility of emitter main body 121 and film 122 can be adjusted by use of an elastic resin material. Examples of the method of adjusting the flexibility of emitter main body 121 and film 122 include selection of elastic resins, adjustment of the mixing ratio of an elastic resin material to a hard resin material, and the like. An integral molded article of emitter main body 121 and film 122 can be manufactured by injection molding, for example.

Emitter 120 includes intake part 150, first connecting groove 131 that serves as first connecting channel 141, first pressure reducing groove 132 that serves as first pressure reducing channel 142, second connecting groove 133 that serves as second connecting channel 143, second pressure reducing groove 134 that serves as second pressure reducing channel 144, third pressure reducing groove 135 that serves as third pressure reducing channel 145, flow rate reducing part 160, channel opening-closing part 170, and discharging part 180. Intake part 150, flow rate reducing part 160 and channel opening-closing part 170 are disposed on front surface 125 side of emitter 120. In addition, first connecting groove 131, first pressure reducing groove 132, second connecting groove 133, second pressure reducing groove 134, third pressure reducing groove 135 and discharging part 180 are disposed on rear surface 124 side of emitter 120.

When emitter 120 and tube 110 are joined, first connecting groove 131, first pressure reducing groove 132, second connecting groove 133, second pressure reducing groove 134 and third pressure reducing groove 135 serve as first connecting channel 141, first pressure reducing channel 142, second connecting channel 143, second pressure reducing channel 144 and third pressure reducing channel 145, respectively. With this configuration, a first channel, which is composed of intake part 150, first connecting channel 141, first pressure reducing channel 142, second connecting channel 143, second pressure reducing channel 144, flow rate reducing part 160 and discharging part 180, and is configured to connect intake part 150 and discharging part 180, is formed. In addition, a second channel, which is composed of intake part 150, first connecting channel 141, first pressure reducing channel 142, second connecting channel 143, third pressure reducing channel 145, channel opening-closing part 170, channel reducing part 160 and discharging part 180, and is configured to connect intake part 150 and discharging part 180, is formed. Each of the first channel and the second channel distributes irrigation liquid from intake part 150 to discharging part 180. In the present embodiment, the first channel and the second channel overlap in the region between intake part 150 and second connecting channel 143. In addition, the downstream side of channel opening-closing part 170 in the second channel is connected with flow rate reducing part 160, and the first channel and the second channel also overlap in the region between flow rate reducing part 160 and discharging part 180.

Intake part 150 is disposed in approximately one-half of front surface 125 of emitter 120 (see FIGS. 2A and 2B). In the region where intake part 150 is not disposed in front surface 125, flow rate reducing part 160 and channel opening-closing part 170 (film 122) are disposed. Intake part 150 includes intake side screen part 151 and intake through hole 152.

Intake side screen part 151 prevents entry, into intake recess 153, of floating matters in the irrigation liquid to be taken into emitter 120. Intake side screen part 151 opens to the inside of tube 110, and includes intake recess 153, a plurality of slits 154 and a plurality of projection lines 155.

Intake recess 153 is one recess entirely formed in the region where film 122 is not joined in front surface 125 of emitter 120. The depth of intake recess 153 is not limited, and is appropriately set in accordance with the size of emitter 120. Slits 154 are formed in the outer periphery wall of intake recess 153, and projection lines 155 are formed on the bottom surface of intake recess 153. In addition, intake through hole 152 is formed in the bottom surface of intake recess 153.

Slits 154 connect the inner surface of intake recess 153 and the outer surface of emitter main body 121, and prevent entry, into intake recess 153, of the floating matters in the irrigation liquid while allowing the irrigation liquid to enter intake recess 153 from the side surface of emitter main body 121. The shape of slit 154 is not limited as long as the above-described function can be ensured. In the present embodiment, slit 154 is formed in a shape whose width increases from the outer surface of emitter main body 121 toward the inner surface of intake recess 153 (see FIGS. 2A and 2B). Thus, slit 154 has a so-called wedge wire structure, and therefore the pressure drop of the irrigation liquid having entered intake recess 153 is suppressed.

Projection lines 155 are disposed on the bottom surface of intake recess 153. The placement and the number of projection lines 155 are not limited as long as entry of floating matters of irrigation liquid can be prevented while allowing entry of the irrigation liquid from the opening side of intake recess 153. In the present embodiment, projection lines 155 are arranged such that the longitudinal axial direction of projection lines 155 matches the minor axial direction of emitter 120. In addition, each projection line 155 is formed such that the width thereof decreases from front surface 125 of emitter main body 121 toward the bottom surface of intake recess 153 (see FIG. 3B). That is, in the arrangement direction of projection lines 155, the space between projection lines 155 adjacent to each other has a so-called wedge wire structure. In addition, the distance between projection lines 155 adjacent to each other is not limited as long as the above-described function can be ensured. Since the space between projection lines 155 adjacent to each other has a so-called wedge wire structure as described above, the pressure drop of the irrigation liquid having entered intake recess 153 is suppressed.

Intake through hole 152 is formed in the bottom surface of intake recess 153. The shape and the number of intake through hole 152 are not limited as long as the irrigation liquid taken into intake recess 153 can be taken into emitter main body 121. In the present embodiment, intake through hole 152 is one long hole formed along the longitudinal axial direction of emitter 120 in the bottom surface of intake recess 153. This long hole is partially covered with projection lines 155, and therefore, intake through hole 152 appears to be divided into a plurality of through holes when viewed from front surface 125 side.

The irrigation liquid that has passed through the inside of tube 110 is taken into emitter main body 121 while the floating matters therein are prevented from entering intake recess 153 by intake side screen part 151.

First connecting groove 131 (first connecting channel 141) connects intake through hole 152 (intake part 150) and first pressure reducing groove 132. First connecting groove 131 is formed in a linear shape along the longitudinal axial direction of emitter 120 at the outer edge of rear surface 124. When tube 110 and emitter 120 are joined, first connecting groove 131 and the inner wall surface of tube 110 form first connecting channel 141. The irrigation liquid taken from intake part 150 flows to first pressure reducing channel 142 through first connecting channel 141.

First pressure reducing groove 132 (first pressure reducing channel 142) is disposed in the first channel and the second channel on the upstream side of flow rate reducing part 160, and connects first connecting groove 131 (first connecting channel 141) and second connecting groove 133 (second connecting channel 143). First pressure reducing groove 132 (first pressure reducing channel 142) reduces the pressure of the irrigation liquid taken from intake part 150, and guides the liquid to second connecting groove 133 (second connecting channel 143). First pressure reducing groove 132 is disposed in a linear shape along the longitudinal axial direction of emitter 120 at the outer edge of rear surface 124. The upstream end of first pressure reducing groove 132 is connected with first connecting groove 131, and the downstream end of first pressure reducing groove 132 is connected with the upstream end of second connecting groove 133. The shape of first pressure reducing groove 132 is not limited as long as the above-described function can be ensured. In the present embodiment, in plan view, first pressure reducing groove 132 has a zigzag shape. In first pressure reducing groove 132, first protrusions 136, each of which has a substantially triangular prism shape and protrudes from the inner surface of first pressure reducing groove 132, are alternately disposed along the flow direction of the irrigation liquid. In plan view, first protrusions 136 are disposed such that the tip of each first protrusion 136 does not cross the central axis of first pressure reducing groove 132. When tube 110 and emitter 120 are joined, first pressure reducing groove 132 and the inner wall surface of tube 110 form first pressure reducing channel 142. The irrigation liquid taken from intake part 150 is guided to second connecting groove 133 (second connecting channel 143) while the pressure thereof is reduced by first pressure reducing channel 142.

Second connecting groove 133 (second connecting channel 143) connects first pressure reducing groove 132 (first pressure reducing channel 142), second pressure reducing groove 134 (second pressure reducing channel 144) and third pressure reducing groove 135 (third pressure reducing channel 145). Second connecting groove 133 is formed in a linear shape along the minor axial direction of emitter 120 at the outer edge of rear surface 124. When tube 110 and emitter 120 are joined, second connecting groove 133 and the inner wall surface of tube 110 form second connecting channel 143. The irrigation liquid which has been taken from intake part 150 and guided to first connecting channel 141 while the pressure thereof is reduced by first pressure reducing channel 142 is guided to second pressure reducing channel 144 and third pressure reducing channel 145 through second connecting channel 143.

Second pressure reducing groove 134 (second pressure reducing channel 144) is disposed on the upstream side of flow rate reducing part 160 in the first channel, and connects second connecting groove 133 (second connecting channel 143) and flow rate reducing part 160. Second pressure reducing groove 134 (second pressure reducing channel 144) guides, to flow rate reducing part 160, the irrigation liquid coming from second connecting groove 133 (second connecting channel 143) while reducing the pressure of the liquid. Second pressure reducing groove 134 is disposed along the longitudinal axial direction of emitter 120 at the outer edge of rear surface 124. The upstream end of second pressure reducing groove 134 is connected with the downstream end of second connecting groove 133, and the downstream end of second pressure reducing groove 134 is connected with first connecting through hole 165 communicated with flow rate reducing part 160. The shape of second pressure reducing groove 134 is not limited as long as the above-described function can be ensured. In the present embodiment, in plan view, second pressure reducing groove 134 has a zigzag shape as with the shape of first pressure reducing groove 132. In second pressure reducing groove 134, second protrusions 137, each of which protrudes from the inner surface of second pressure reducing groove 134 and has a substantially triangular prism shape, are alternately disposed along the flow direction of the irrigation liquid. In plan view, second protrusions 137 are disposed such that the tip of each second protrusion 137 does not cross the central axis of second pressure reducing groove 134. When tube 110 and emitter 120 are joined, second pressure reducing groove 134 and the inner wall surface of tube 110 form second pressure reducing channel 144. In the present embodiment, second pressure reducing groove 134 (second pressure reducing channel 144) is longer than third pressure reducing groove 135 (third pressure reducing channel 145) described later. Accordingly, the pressure of the irrigation liquid flowing through second pressure reducing groove 134 (second pressure reducing channel 144) is reduced more than the irrigation liquid flowing through third pressure reducing groove 135 (third pressure reducing channel 145). A part of the irrigation liquid which has been taken from intake part 150 while the pressure thereof being reduced is guided to flow rate reducing part 160 while the pressure thereof is reduced by second pressure reducing channel 144.

Third pressure reducing groove 135 (third pressure reducing channel 145) is disposed on the upstream side of flow rate reducing part 160 in the second channel, and connects second connecting groove 133 (second connecting channel 143) and channel opening-closing part 170. Third pressure reducing groove 135 (third pressure reducing channel 145) guides, to channel opening-closing part 170, the irrigation liquid coming from second connecting groove 133 (second connecting channel 143) while reducing the pressure of the liquid. Third pressure reducing groove 135 is disposed along the longitudinal axial direction of emitter 120 at a center portion of rear surface 124. The upstream end of third pressure reducing groove 135 is connected with the downstream end of second connecting channel 143, and the downstream end of third pressure reducing groove 135 is connected with third connecting through hole 174 communicated with channel opening-closing part 170. The shape of third pressure reducing groove 135 is not limited as long as the above-described function can be ensured. In the present embodiment, in plan view, third pressure reducing groove 135 has a zigzag shape as with the shape of first pressure reducing groove 132. In third pressure reducing groove 135, third protrusions 138, each of which has a substantially triangular prism shape and protrudes from the inner surface of third pressure reducing groove 135, are alternately disposed along the flow direction of the irrigation liquid. In plan view, third protrusions 138 are disposed such that the tip of each third protrusion 138 does not cross the central axis of third pressure reducing groove 135. When tube 110 and emitter 120 are joined, third pressure reducing groove 135 and the inner wall surface of tube 110 form third pressure reducing channel 145. Another part of the irrigation liquid which has taken from intake part 150 while the pressure thereof is reduced by first pressure reducing channel 142 is guided to channel opening-closing part 170 while the pressure thereof is reduced by third pressure reducing channel 145. As elaborated later, the second channel operates only when the pressure of the irrigation liquid is low.

Flow rate reducing part 160 is disposed between second pressure reducing channel 144 (second pressure reducing groove 134) and discharging part 180 in the first channel on front surface 125 side of emitter 120. Flow rate reducing part 160 sends the irrigation liquid to discharging part 180 while reducing the flow rate of the irrigation liquid in accordance with the pressure of the irrigation liquid in tube 110. The configuration of flow rate reducing part 160 is not limited as long as the above-described function can be ensured. In the present embodiment, flow rate reducing part 160 includes flow rate reducing recess 161, first valve seat part 162, communication groove 163, flow rate reducing through hole 164 communicated with discharging part 180, first connecting through hole 165 communicated with second pressure reducing groove 134 (second pressure reducing channel 144), second connecting through hole 166 communicated with channel opening-closing through hole 173 of channel opening-closing part 170, and first diaphragm part 167 that is a part of film 122. At the inner surface of flow rate reducing recess 161, flow rate reducing through hole 164 communicated with discharging part 180, first connecting through hole 165 communicated with second pressure reducing groove 134 (second pressure reducing channel 144), and second connecting through hole 166 communicated with channel opening-closing through hole 173 of channel opening-closing part 170 open.

In plan view, flow rate reducing recess 161 has a substantially circular shape. In the bottom surface of flow rate reducing recess 161, flow rate reducing through hole 164 communicated with discharging part 180, first connecting through hole 165 communicated with second pressure reducing groove 134 (second pressure reducing channel 144), and second connecting through hole 166 communicated with channel opening-closing part 170, and first valve seat part 162 are disposed. The depth of flow rate reducing recess 161 is not limited as long as the depth of flow rate reducing recess 161 is equal to or greater than the depth of communication groove 163.

Flow rate reducing through hole 164 is disposed at a center portion of the bottom surface of flow rate reducing recess 161, and is communicated with discharging part 180. First valve seat part 162 is disposed on the bottom surface of flow rate reducing recess 161 to surround flow rate reducing through hole 164. First valve seat part 162 is formed such that first valve seat part 162 can make intimate contact with first diaphragm part 167 when the pressure of the irrigation liquid flowing through tube 110 is the second pressure or greater. When first diaphragm part 167 makes contact with first valve seat part 162, the flow rate of the irrigation liquid flowing from flow rate reducing recess 161 into discharging part 180 is reduced. The shape of first valve seat part 162 is not limited as long as the above-described function can be ensured. In the present embodiment, first valve seat part 162 is an annular protrusion. In the present embodiment, the height of the end surface of the annular protrusion from the bottom surface of flow rate reducing recess 161 decreases from the inner side toward the outer side. Communication groove 163, which communicates between the inside of flow rate reducing recess 161 and flow rate reducing through hole 164, is formed in a part of the region of first valve seat part 162 where first diaphragm part 167 can make intimate contact with first valve seat part 162. First connecting through hole 165 communicated with second pressure reducing groove 134 (second pressure reducing channel 144) and second connecting through hole 166 communicated with channel opening-closing through hole 173 of channel opening-closing part 170 are formed in the region where first valve seat part 162 is not disposed in the bottom surface of flow rate reducing recess 161. It is to be noted that first connecting through hole 165 communicated with second pressure reducing groove 134 (second pressure reducing channel 144) may be disposed so as to be surrounded by first valve seat part 162, and flow rate reducing through hole 164 communicated with discharging part 180 may be disposed outside first valve seat part 162.

First diaphragm part 167 is a part of film 122. First diaphragm part 167 is disposed in such a manner as to close the communication between the inside of flow rate reducing recess 161 and the inside of tube 110. First diaphragm part 167 has flexibility, and deforms in such a manner as to make contact with first valve seat part 162 in accordance with the pressure of the irrigation liquid in tube 110. To be more specific, first diaphragm part 167 deforms toward first valve seat part 162 as the pressure of the irrigation liquid increases, and finally makes contact with first valve seat part 162. Even when first diaphragm part 167 is in intimate contact with first valve seat part 162, neither of first connecting through hole 165, flow rate reducing through hole 164 nor communication groove 163 is closed by first diaphragm part 167, and therefore the irrigation liquid sent from first connecting through hole 165 can be sent to discharging part 180 through communication groove 163 and flow rate reducing through hole 164. It is to be noted that first diaphragm part 167 is disposed next to second diaphragm part 175 described later.

First diaphragm part 167 includes first thin part 168 that has a ring-like shape and a thickness smaller than that of other portions of first diaphragm part 167. First thin part 168 is disposed to surround a region where first diaphragm part 167 can make intimate contact with first valve seat part 162 on the inside of the opening of flow rate reducing recess 161. In the present embodiment, first thin part 168 is disposed in an annular shape in such a manner as to surround a region where first diaphragm part 167 can make intimate contact with first valve seat part 162. First thin part 168 is formed such that first thin part 168 is recessed with respect to the inside (irrigation liquid side) of tube 110 (in the form of a recessed line), and is protruded with respect to flow rate reducing recess 161 (in the form of a projected line). The width of first thin part 168 is, but not limited to, 1.5 mm, for example. The cross-sectional shape of first thin part 168 is, but not limited to, a substantially semicircular shape, a substantially semi-elliptical shape, a substantially semi-quadrangular shape or a substantially semi-polygonal shape, for example. The shape of first thin part 168 in plan view is a circular shape, an elliptical shape, a quadrangular shape or a polygonal shape, for example, and is not limited as long as the shape is a ring-like shape. In the present embodiment, as illustrated in FIGS. 2A and 3B, first thin part 168 has a substantially semicircular shape in cross section, and a circular shape in plan view. First thin part 168 may be formed by expanding and fixing film 122 having a planer shape with a jig, or may be formed at the time of forming film 122.

Channel opening-closing part 170 is disposed between third pressure reducing channel 145 (third pressure reducing groove 135) and discharging part 180 in the second channel on front surface 125 side of emitter 120. Channel opening-closing part 170 opens the second channel in accordance with the pressure in tube 110, and sends the irrigation liquid to discharging part 180. In the present embodiment, channel opening-closing part 170 is connected with flow rate reducing part 160 through channel opening-closing through hole 173 and second connecting through hole 166, and the irrigation liquid from third pressure reducing channel 145 (third pressure reducing groove 135) reaches discharging part 180 through channel opening-closing part 170 and flow rate reducing part 160. The configuration of channel opening-closing part 170 is not limited as long as the above-described function can be ensured. In the present embodiment, channel opening-closing part 170 includes channel opening-closing recess 171, second valve seat part 172, channel opening-closing through hole 173 communicated with second connecting through hole 166 of flow rate reducing part 160, third connecting through hole 174 communicated with third pressure reducing channel 145 (third pressure reducing groove 135), and second diaphragm part 175 that is a part of film 122. At the inner surface of channel opening-closing recess 171, third connecting through hole 174 communicated with third pressure reducing channel 145 (third pressure reducing groove 135), and channel opening-closing through hole 173 communicated with flow rate reducing part 160 open. In addition, channel opening-closing recess 171 is communicated with flow rate reducing recess 161 of flow rate reducing part 160.

In plan view, channel opening-closing recess 171 has a substantially circular shape. In the bottom surface of channel opening-closing recess 171, third connecting through hole 174 connected with third pressure reducing groove 135, channel opening-closing through hole 173 connected with flow rate reducing part 160, and second valve seat part 172 are disposed. The end surface of second valve seat part 172 is disposed on front surface 125 side relative to the end surface of first valve seat part 162. That is, second valve seat part 172 is higher than first valve seat part 162. With this configuration, when film 122 is deformed with the pressure of the irrigation liquid, film 122 first makes contact with second valve seat part 172 before making contact with first valve seat part 162.

Third connecting through hole 174 communicated with third pressure reducing groove 135 is disposed in the region where second valve seat part 172 is not disposed in the bottom surface of channel opening-closing recess 171. Second valve seat part 172 is disposed on the bottom surface of channel opening-closing recess 171 to surround channel opening-closing through hole 173. In addition, second valve seat part 172 is disposed to face second diaphragm part 175 without making contact with second diaphragm part 175, and is formed such that second diaphragm part 175 can make intimate contact with second valve seat part 172 when the pressure of the irrigation liquid flowing through tube 110 is the first pressure or greater. When the pressure of the irrigation liquid flowing through tube 110 is the first pressure or greater, second diaphragm part 175 makes intimate contact with second valve seat part 172 to close channel opening-closing through hole 173, and as a result, the second channel is closed. The shape of second valve seat part 172 is not limited as long as the above-described function can be ensured. In the present embodiment, second valve seat part 172 is an annular-shaped protrusion disposed to surround channel opening-closing through hole 173.

Second diaphragm part 175 is a part of film 122, and is disposed next to first diaphragm part 167. Second diaphragm part 175 is disposed in such a manner as to close the communication between the inside of channel opening-closing recess 171 and the inside of tube 110. Second diaphragm part 175 has flexibility, and deforms in such a manner as to make contact with second valve seat part 172 in accordance with the pressure of the irrigation liquid in tube 110. To be more specific, second diaphragm part 175 deforms toward second valve seat part 172 as the pressure of the irrigation liquid increases, and, when the pressure of the irrigation liquid becomes the first pressure, makes contact with second valve seat part 172. In this manner, the second channel (channel opening-closing through hole 173) is closed.

Second diaphragm part 175 includes second thin part 176 having a ring-like shape and a thickness smaller than that of other portions of second diaphragm part 175. Second thin part 176 is disposed to surround a region where second diaphragm part 175 can make intimate contact with second valve seat part 172 on the inside of the opening of flow rate opening-closing recess 171. In the present embodiment, second thin part 176 is disposed in an annular shape in such a manner as to surround a region where second diaphragm part 175 can make intimate contact with second valve seat part 172. Second thin part 176 is formed such that second thin part 176 is recessed with respect to the inside (irrigation liquid side) of tube 110 (in the form of a recessed line), and is protruded with respect to flow rate opening-closing recess 171 (in the form of a projected line). The width of second thin part 176 is, but not limited to, 1.5 mm, for example. The shapes of second thin part 176 in cross section and in plan view are similar to those of first thin part 168. In the present embodiment, as illustrated in FIGS. 2A and 3B, second thin part 176 has a substantially semicircular shape in cross section, and a circular shape in plan view. Second thin part 176 may be formed by expanding and fixing film 122 having a planer shape with a jig, or may be formed at the time of forming film 122.

Discharging part 180 is disposed to face discharging port 112 on rear surface 124 side of emitter 120. Discharging part 180 sends, to discharging port 112 of tube 110, the irrigation liquid coming from flow rate reducing through hole 164. With this configuration, discharging part 180 can discharge the irrigation liquid out of emitter 120. The configuration of discharging part 180 is not limited as long as the above-described function can be ensured. In the present embodiment, discharging part 180 includes discharging recess 181 and entry preventing part 182.

Discharging recess 181 is disposed on rear surface 124 side of emitter 120. In plan view, discharging recess 181 has a substantially rectangular shape. In the bottom surface of discharging recess 181, flow rate reducing through hole 164 and entry preventing part 182 are disposed.

Entry preventing part 182 prevents entry of foreign matters from discharging port 112. Entry preventing part 182 is not limited as long as the above-described function can be ensured. In the present embodiment, entry preventing part 182 includes two projection line parts 183 disposed next to each other. Two projection line parts 183 are disposed such that projection line parts 183 are located between flow rate reducing through hole 164 and discharging port 112 when emitter 120 is joined to tube 110.

Film 122 includes first diaphragm part 167 including first thin part 168, and second diaphragm part 175 including second thin part 176. Preferably, the thickness of film 122 in the regions other than first thin part 168 and second thin part 176 is, for example, 0.3 mm from a view point of the durability of film 122. In addition, preferably, the thickness of film 122 in the regions of first thin part 168 and second thin part 176 is, for example, 0.15 mm from a view point of the ease of deformation of film 122.

Hinge part 123 is connected with a part of front surface 125 of emitter main body 121. In the present embodiment, the thickness of hinge part 123 is identical to the thickness of film 122, and hinge part 123 is formed integrally with emitter main body 121 and film 122. It is to be noted that film 122 may be prepared as a separate member that is separated from emitter main body 121 and is joined to emitter main body 121.

Emitter 120 is configured when film 122 is joined to front surface 125 of emitter main body 121 by turning film 122 about hinge part 123. The method of joining emitter main body 121 and film 122 is not limited. Examples of the method of joining emitter main body 121 and film 122 include welding of the resin material of film 122, bonding with an adhesive agent, and the like. It is to be noted that hinge part 123 may be cut out after emitter main body 121 and film 122 are joined.

(Operations of Drip Irrigation Tube and Emitter)

Next, an operation of drip irrigation tube 100 is described. First, irrigation liquid is fed into tube 110. Examples of the irrigation liquid include water, liquid fertilizer, agricultural chemicals and mixtures thereof. Preferably, the pressure of the irrigation liquid that is fed to drip irrigation tube 100 is 0.1 MPa or lower in view of simply implementing the drip irrigation method, or preventing damaging of tube 110 and emitter 120. The irrigation liquid in tube 110 is taken into emitter 120 from intake part 150. To be more specific, the irrigation liquid in tube 110 enters intake recess 153 from the gap between slits 154, or the gap between projection lines 155 and passes through intake through hole 152. At this time, the floating matters in the irrigation liquid can be removed since intake part 150 includes intake side screen part 151 (the gaps between slits 154 and projection lines 155). In addition, the pressure drop of the irrigation liquid having entered intake part 150 is suppressed since a so-called wedge wire structure is formed in intake part 150.

The irrigation liquid taken from intake part 150 reaches first connecting channel 141. The irrigation liquid having reached first connecting channel 141 reaches second connecting channel 143 through first pressure reducing channel 142. The irrigation liquid having reached second connecting channel 143 flows into second pressure reducing channel 144 and third pressure reducing channel 145. At this time, the irrigation liquid first advances through third pressure reducing channel 145 that causes smaller pressure drop and has a shorter channel length in comparison with second pressure reducing channel 144. The irrigation liquid having entered third pressure reducing channel 145 flows into channel opening-closing part 170 through third connecting through hole 174.

The irrigation liquid having entered channel opening-closing part 170 flows into flow rate reducing part 160 through channel opening-closing through hole 173 and second connecting through hole 166. Next, the irrigation liquid having entered flow rate reducing part 160 flows into discharging part 180 through flow rate reducing through hole 164. Finally, the irrigation liquid having entered discharging part 180 is discharged out of tube 110 from discharging port 112 of tube 110.

On the other hand, the irrigation liquid having entered second pressure reducing channel 144 flows into flow rate reducing part 160 through first connecting through hole 165. The irrigation liquid having entered flow rate reducing part 160 flows into discharging part 180 through flow rate reducing through hole 164. As elaborated later, a three-dimensionally swirling vortex is generated in pressure reducing channel 142. The irrigation liquid having entered discharging part 180 is discharged out of tube 110 from discharging port 112 of tube 110.

As described above, channel opening-closing part 170 and flow rate reducing part 160 are communicated with each other through channel opening-closing through hole 173 and second connecting through hole 166. In addition, in flow rate reducing part 160, first diaphragm part 167 deforms in accordance with the pressure of the irrigation liquid in tube 110, whereby the flow rate of the irrigation liquid is controlled. In channel opening-closing part 170, second diaphragm part 175 deforms in accordance with the pressure of the irrigation liquid in tube 110, whereby the flow rate of the irrigation liquid is controlled. In view of this, operations of flow rate reducing part 160 and channel opening-closing part 170 in accordance with the pressure of the irrigation liquid in tube 110 are described.

Figure 4A:
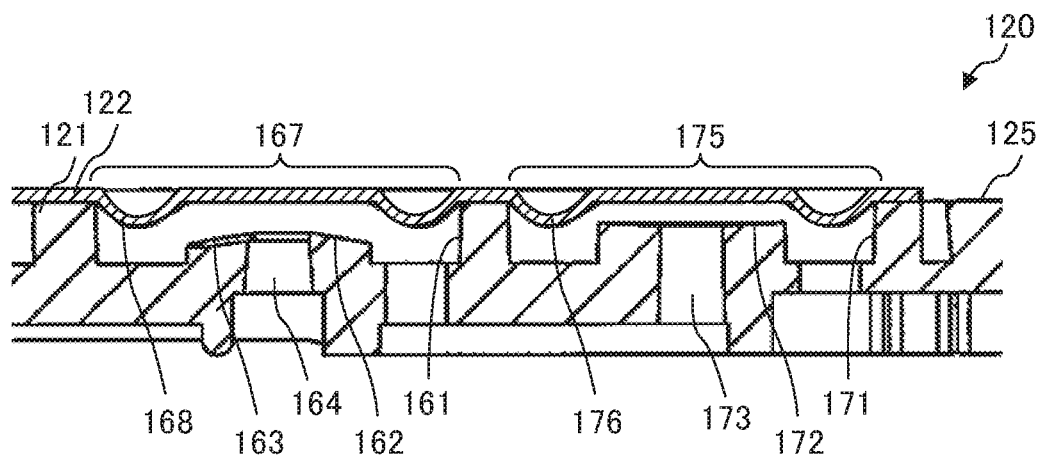
FIGS. 4A to 4C are schematic views for describing an operation of the emitter according to the embodiment of the present invention.
Figure 4B:
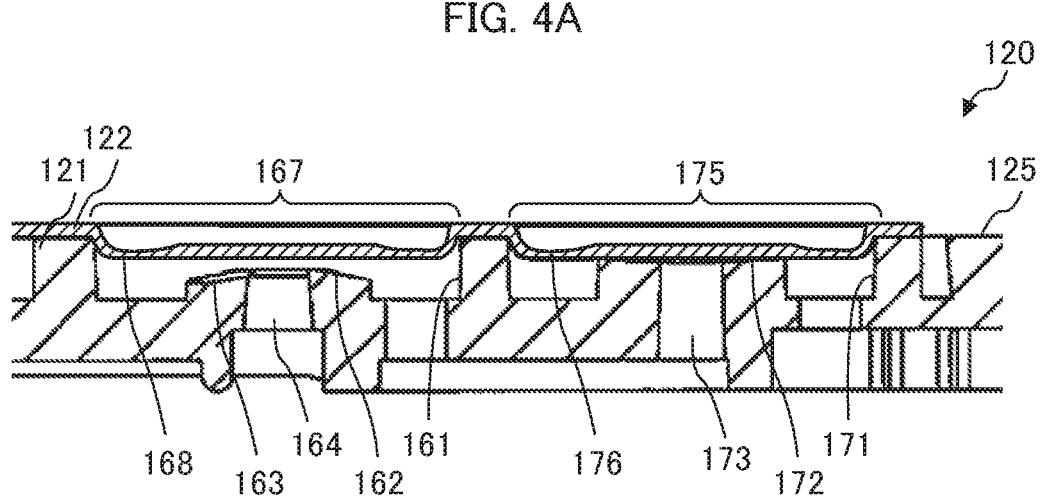
Figure 4C:
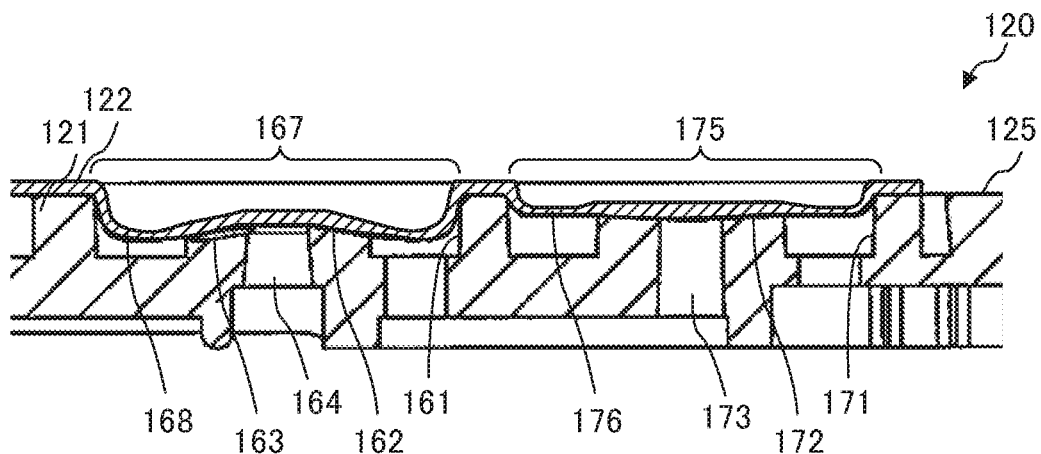

FIGS. 4A to 4C are schematic views illustrating an operational relationship between flow rate reducing part 160 and channel opening-closing part 170. It is to be noted that FIGS. 4A to 4C are schematic cross-sectional views taken along line B-B of FIG. 2B for describing an operation of emitter 120. FIG. 4A is a sectional view of a state where no irrigation liquid is fed to tube 110, FIG. 4B is a sectional view of a state where the pressure of the irrigation liquid in tube 110 is a first pressure, and FIG. 4C is a sectional view of a state where the pressure of the irrigation liquid in tube 110 is a second pressure greater than the first pressure.

In a state before the irrigation liquid is fed into tube 110, no pressure of the irrigation liquid is applied to film 122, and therefore neither first diaphragm part 167 nor second diaphragm part 175 deforms (see FIG. 4A).

When the feeding of the irrigation liquid into tube 110 is started, first thin part 168 whose thickness is smaller than that of other portions in first diaphragm part 167, and second thin part 176 whose thickness is smaller than that of other portions in second diaphragm part 175 start to deform at first. At this time, while the portions that can be brought into contact with first valve seat part 162 and second valve seat part 172 in first diaphragm part 167 and second diaphragm part 175 are still not deformed, first thin part 168 and second thin part 176 are deformed and thus moved toward first valve seat part 162 and second valve seat part 172. In this state, however, second diaphragm part 175 is not in intimate contact with second valve seat part 172, and accordingly the irrigation liquid taken from intake part 150 is discharged out of tube 110 from discharging port 112 through both the first channel (first connecting channel 141, first pressure reducing channel 142, second connecting channel 143, second pressure reducing channel 144, flow rate reducing part 160 and discharging part 180) and the second channel (first connecting channel 141, first pressure reducing channel 142, second connecting channel 143, third pressure reducing channel 145, channel opening-closing part 170, flow rate reducing part 160 and discharging part 180). In this manner, at the start of feeding of the irrigation liquid to tube 110, and/or in the case where the pressure of the irrigation liquid in tube 110 is lower than a predetermined pressure, the irrigation liquid taken from intake part 150 is discharged through both the first channel and the second channel.

Next, when the pressure of the irrigation liquid in tube 110 increases, first diaphragm part 167 and second diaphragm part 175 further deform. Then, second diaphragm part 175 makes contact with second valve seat part 172 and closes the second channel (see FIG. 4B). At this time, since the end surface of second valve seat part 172 is disposed on the front surface 125 side relative to the end surface of first valve seat part 162, second diaphragm part 175 makes contact with second valve seat part 172 before first diaphragm part 167 makes contact with first valve seat part 162. At this time, first diaphragm part 167 is not in contact with first valve seat part 162. In this manner, when the pressure of the irrigation liquid in tube 110 is so increased as to deform film 122, second diaphragm part 175 comes closer to second valve seat part 172, and accordingly the amount of the irrigation liquid that is discharged through the second channel decreases. Then, when the pressure of the irrigation liquid in tube 110 becomes the first pressure, the irrigation liquid in the second channel is not discharged from discharging port 112. As a result, the irrigation liquid taken from intake part 150 is discharged to the outside from discharging port 112 of tube 110 through only the first channel.

When the pressure of the irrigation liquid in tube 110 further increases, first diaphragm part 167 further deforms toward first valve seat part 162. In a normal configuration, the amount of the irrigation liquid that flows through the first channel increases as the pressure of the irrigation liquid increases; however, in emitter 120 according to the present embodiment, excessive increase in the amount of the liquid that flows through the first channel irrigation is prevented by reducing the distance between first diaphragm part 167 and first valve seat part 162 while the pressure of the irrigation liquid is reduced by first pressure reducing channel 142 and second pressure reducing channel 144. When the pressure of the irrigation liquid in tube 110 is equal to or greater than the second pressure, which is greater than the first pressure, first diaphragm part 167 makes contact with first valve seat part 162 (see FIG. 4C). Even in this state, neither of first connecting through hole 165, flow rate reducing through hole 164 nor communication groove 163 is closed by first diaphragm part 167, and accordingly the irrigation liquid taken from intake part 150 is discharged to the outside from discharging port 112 of tube 110 through communication groove 163. In this manner, in flow rate reducing part 160, when the pressure of the irrigation liquid in tube 110 is equal to or greater than the second pressure, first diaphragm part 167 makes contact with first valve seat part 162, and thus increase of the amount of the irrigation liquid that flows through the first channel is suppressed.

As described above, flow rate reducing part 160 and channel opening-closing part 170 operate such that the amounts of the liquid flowing therethrough are offset each other in accordance with the pressure of the irrigation liquid in tube 110, and thus the drip irrigation tube according to the present embodiment can discharge a constant amount of irrigation liquid out of tube 110 regardless whether the pressure of the irrigation liquid is high or low.

(Effect)

As described above, emitter 120 according to the present embodiment includes channel opening-closing part 170 that mainly operates in the low pressure state, and flow rate reducing part 160 that mainly operates in the high pressure state. Thus emitter 120 according to the present embodiment can quantitatively drop the irrigation liquid regardless of the pressure of the irrigation liquid in tube 110. In addition, emitter 120 according to the present embodiment includes first thin part 168 disposed to surround a region where first diaphragm part 167 can make intimate contact with first valve seat part 162, and second thin part 176 disposed to surround a region where second diaphragm part 175 can make intimate contact with second valve seat part 172. First thin part 168 is formed such that first thin part 168 is recessed with respect to the inside of tube 110, and is protruded with respect to flow rate reducing recess 161. Likewise, second thin part 176 is formed such that second thin part 176 is recessed with respect to the inside of tube 110, and is protruded with respect to channel opening-closing recess 171. In addition, the thickness of first thin part 168 is smaller than that of other portions of first diaphragm part 167, and the thickness of second thin part 176 is smaller than that of other portions of second diaphragm part 175. With this configuration, first thin part 168 and second thin part 176 easily receive a pressure of the irrigation liquid and easily deform in comparison with other regions of first diaphragm part 167 and other regions of second diaphragm part 175, respectively. Thus, the adjustment of the flow rate in the channel with the variation in pressure of the irrigation liquid can be speedily performed. In addition, since the portions other than first thin part 168 and second thin part 176 in film 122 have a large thickness, film 122 is easy to handle and the durability of film 122 is not reduced.

It is to be noted that the configurations of the emitter and the drip irrigation tube according to the present invention are not limited to those of emitter 120 and drip irrigation tube 100 according to the embodiment, and each of first pressure reducing channel 142, second connecting channel 143, third pressure reducing channel 145 and channel opening-closing part 170 may not be provided, for example.

In addition, while first connecting channel 141, first pressure reducing channel 142, second connecting channel 143, second pressure reducing channel 144 and third pressure reducing channel 145 are configured to be formed when emitter 120 and tube 110 are joined in the present embodiment, first connecting channel 141, first pressure reducing channel 142, second connecting channel 143, second pressure reducing channel 144 and third pressure reducing channel 145 may be formed in advance as channels in emitter 120.

In addition, while the contact timing of deformed film 122 is adjusted by the difference in heights of first valve seat part 162 and second valve seat part 172 in the present embodiment, the heights of first valve seat part 162 and second valve seat part 172 may be equal to each other. In this case, the contact timing of deformed film 122 may be adjusted by setting different thicknesses and/or by using different materials (materials having different elasticities) between first diaphragm part 167 and second diaphragm part 175.

This application is entitled to and claims the benefit of Japanese Patent Application No. 2015-195669 filed on Oct. 1, 2015, the disclosure each of which including the specification, drawings and abstract is incorporated herein by reference in its entirety.

INDUSTRIAL APPLICABILITY

According to the present invention, an emitter which can drop liquid with an appropriate rate by the pressure of the liquid to be dropped can be easily provided. Accordingly, popularization of the emitter in the technical fields of drip irrigations and endurance tests where long-term dropping is required, and development in the technical fields can be expected.

REFERENCE SIGNS LIST

100 Drip irrigation tube
110 Tube
112 Discharging port
120 Emitter
121 Emitter main body
122 Film
123 Hinge part
124 Rear surface
125 Front surface
131 First connecting groove
132 First pressure reducing groove
133 Second connecting groove
134 Second pressure reducing groove
135 Third pressure reducing groove
136 First protrusion
137 Second protrusion
138 Third protrusion
141 First connecting channel
142 First pressure reducing channel
143 Second connecting channel
144 Second pressure reducing channel
145 Third pressure reducing channel
150 Intake part
151 Intake side screen part
152 Intake through hole
153 Intake recess
154 Slit
155 Projection line
160 Flow rate reducing part
161 Flow rate reducing recess
162 First valve seat part
163 Communication groove 164 Flow rate reducing through hole
165 First connecting through hole
166 Second connecting through hole
167 First diaphragm part
168 First thin part
170 Channel opening-closing part
171 Channel opening-closing recess
172 Second valve seat part
173 Channel opening-closing through hole
174 Third connecting through hole
175 Second diaphragm part
176 Second thin part
180 Discharging part
181 Discharging recess
182 Entry preventing part
183 Projection line part

The invention claimed is:

1. An emitter configured to be joined on an inner wall surface of a tube for carrying irrigation liquid at a position corresponding to a discharging port that communicates between inside and outside of the tube, the emitter being configured to quantitatively discharge the irrigation liquid in the tube from the discharging port to the outside of the tube, the emitter comprising:

an intake for intake of the irrigation liquid;
a discharge configured to be disposed to face the discharging port, and configured to discharge the irrigation liquid;
a channel configured to connect the intake and the discharge, and configured to distribute the irrigation liquid;
a flow rate reducer disposed in the channel, and configured to reduce a flow rate of the irrigation liquid in accordance with a pressure of the irrigation liquid in the tube; and
a pressure reducing channel disposed on an upstream side of the flow rate reducer in the channel, and configured to guide the irrigation liquid taken from the intake to the flow rate reducer while reducing a pressure of the irrigation liquid taken from the intake,
wherein the flow rate reducer includes:
a recess for reducing the flow rate,
a diaphragm part having flexibility that is a part of a film, and is disposed to close a communication between inside of the recess and inside of the tube,
a first through hole that opens at an inner surface of the recess, and is communicated with one of the discharge and the pressure reducing channel,
a second through hole that opens at the inner surface of the recess, and is communicated with the other of the discharge and the pressure reducing channel,
a valve seat part disposed to surround the first through hole or the second through hole and to face the diaphragm part without making contact with the diaphragm part, wherein when a pressure of the irrigation liquid flowing through the tube is greater than a predetermined value, the diaphragm part is allowed to make intimate contact with the valve seat part, and
a communication groove formed on a surface of the valve seat part where the valve seat part is allowed to make intimate contact with the diaphragm part, the communication groove being configured to communicate between the inside of the recess and the first through hole or the second through hole,
wherein the diaphragm part includes a thin part that is disposed in a shape surrounding a region of the diaphragm part where the diaphragm part is allowed to make intimate contact with the valve seat part, and
wherein the thin part is formed such that the thin part is recessed with respect to the inside of the tube, and is protruded with respect to the recess.

2. The emitter according to claim 1, wherein the thin part is disposed in an annular shape surrounding the region of the diaphragm part where the diaphragm part is allowed to make intimate contact with the valve seat part.

3. The emitter according to claim 1,
wherein the emitter is formed with one material having flexibility, and
wherein the diaphragm part is integrally formed as a part of the emitter.

4. A drip irrigation tube comprising:
a tube including a discharging port for discharging irrigation liquid; and
the emitter according to claim 1 that is joined on the inner wall surface of the tube at a position corresponding to the discharging port.

* * * * *